US008500185B1

(12) United States Patent
Krajenke et al.

(10) Patent No.: US 8,500,185 B1
(45) Date of Patent: Aug. 6, 2013

(54) DECKLID HINGE COUNTERBALANCE ASSEMBLY HAVING A STRAIGHT END TORQUE ROD WITH INFINITE ROTATIONAL ADJUSTMENT

(75) Inventors: Gary W. Krajenke, Warren, MI (US); Himanshu H. Mehta, Ann Arbor, MI (US); Alvin N. Standard, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/410,591

(22) Filed: Mar. 2, 2012

(51) Int. Cl.
*B62D 25/10* (2006.01)

(52) U.S. Cl.
USPC .......................................................... 296/76

(58) Field of Classification Search
USPC ............................ 296/76, 146.11, 56, 146.8
See application file for complete search history.

(56) References Cited

U.S. PATENT DOCUMENTS

| | | | | |
|---|---|---|---|---|
| 2,783,495 | A * | 3/1957 | Vigmostad | 16/308 |
| 5,584,099 | A * | 12/1996 | Westerdale | 16/245 |
| 2008/0018131 | A1* | 1/2008 | Heath et al. | 296/76 |

* cited by examiner

*Primary Examiner* — Joseph Pape
(74) *Attorney, Agent, or Firm* — Quinn Law Group, PLLC

(57) ABSTRACT

A counterbalanced decklid hinge assembly for rotatably supporting a decklid relative to a vehicle includes a torque rod extending between a first hinge box and a second hinge box. A support member is rotatably supported by each of the first and second hinge boxes. A linkage system interconnects one axial end of the torque rod to one of the support members. A lever is attached to and rotatable with the other axial end of the torque rod. A clamping block attaches the torque rod to one of the lever and the linkage system, and is configured to provide an infinite degree of rotational adjustment therebetween to infinitely adjust the pre-loaded torque rod.

20 Claims, 5 Drawing Sheets

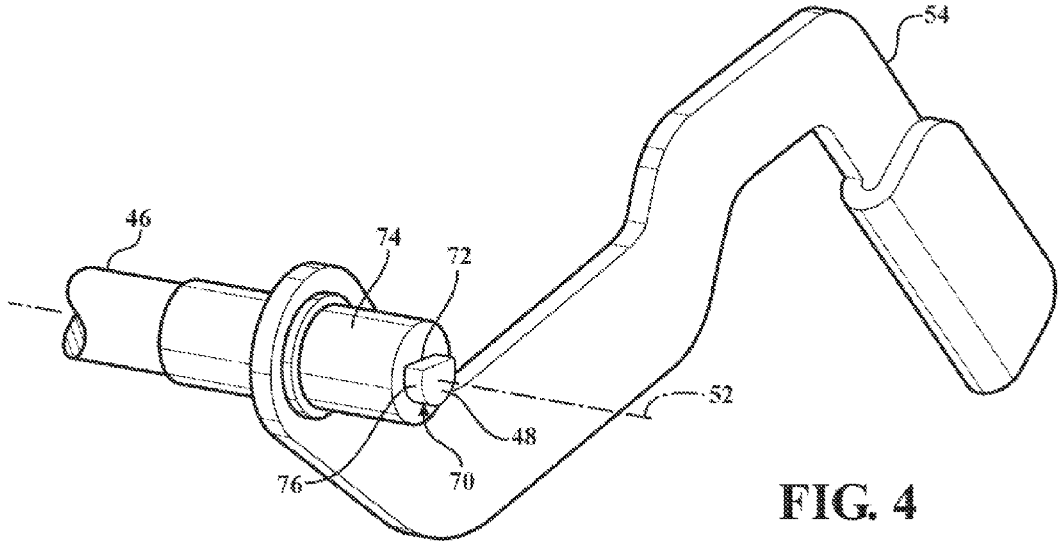
FIG. 4
FIG. 5
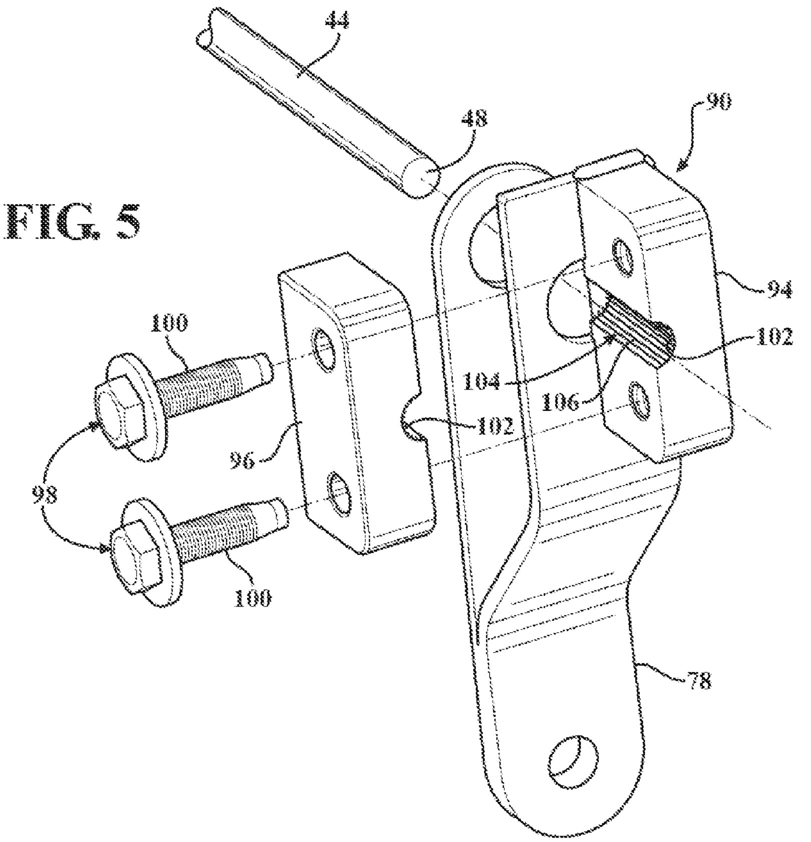

FIG. 6
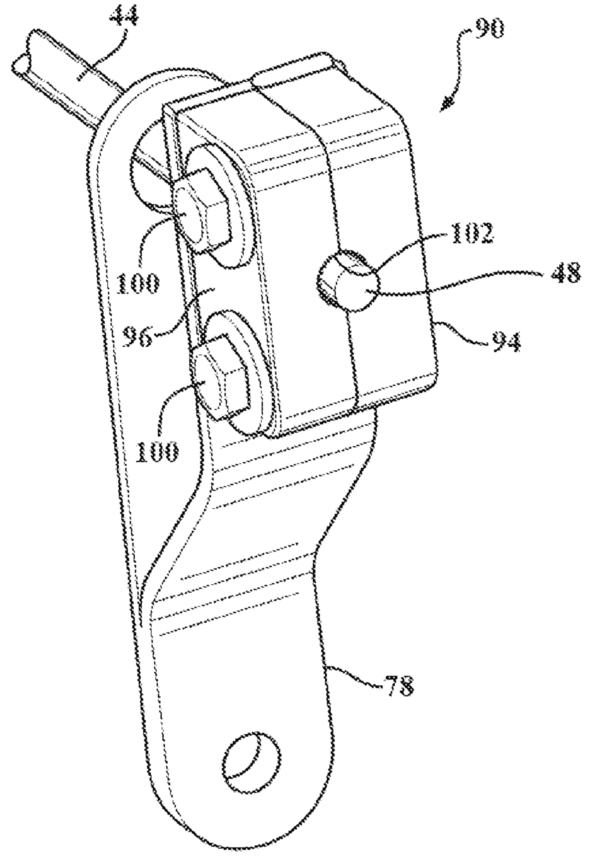
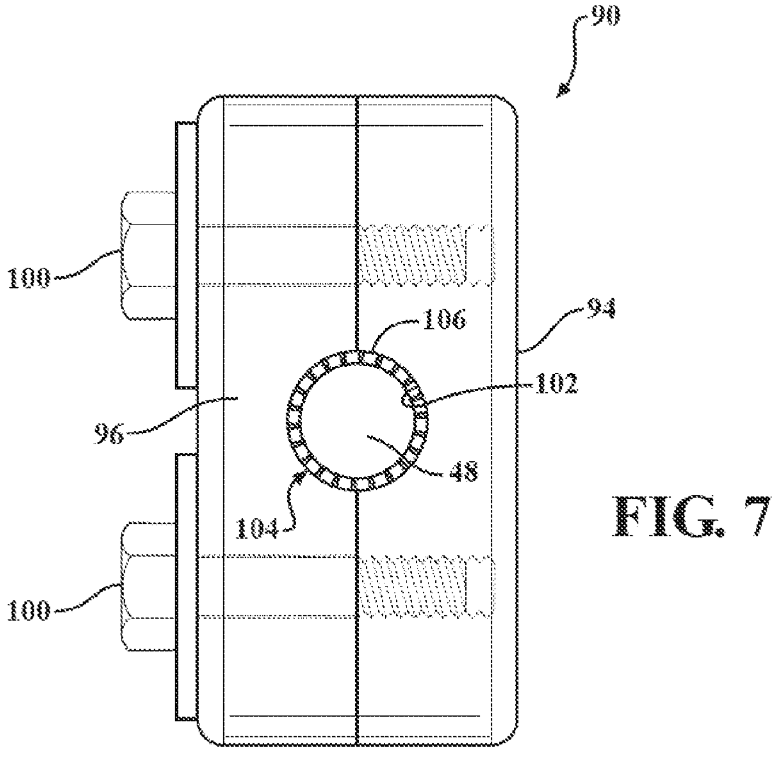
FIG. 7

DECKLID HINGE COUNTERBALANCE ASSEMBLY HAVING A STRAIGHT END TORQUE ROD WITH INFINITE ROTATIONAL ADJUSTMENT

TECHNICAL FIELD

The invention generally relates to a hinge assembly for rotatably supporting a decklid of a vehicle, and more specifically to a counterbalanced hinge assembly having a twisted torque rod extending between a pair of hinge boxes for applying an opening force to the decklid.

BACKGROUND

Counterbalanced decklid hinge assemblies typically include at least one torque rod that extends between a pair of hinge boxes. A support member is rotatably attached to and supported by each of the hinge boxes. One end of the torque rod is bent to define a wind-up end that engages one of the hinge boxes, and the other end of the torque rod is bent to define a looped end that engages one of the support members. The torque rod is twisted during assembly and secured in a position relative to the hinge box to pre-load the torque rod. The pre-loaded torque rod acts as a spring to untwist, thereby applying a torque to the support member to assist in opening the decklid.

The amount of torque that the torque rod is capable of storing is dependent upon the length of the torque rod, with the bent ends of the torque rod reducing the overall effective length of the torque rod. Furthermore, the bent ends of the torque rod induce bending stresses into the torque rod, which decreases the durability of the torque rod. Additionally, such a configuration of the torque rod only allows for a single torque wind up position, thereby limiting the amount of torque that may be pre-loaded into the torque rod. A limited amount of variability may be built into the system by adding different attachment positions to the hinge box to which the wind-up end of the torque rod is attached. However, due to packaging constraints, these variable wind up positions are only able to provide a range of between 3° and 4° of torque rod rotation.

SUMMARY

A decklid hinge assembly for a vehicle is provided. The decklid hinge assembly includes a first hinge box and a second hinge box. The second hinge box is spaced from the first hinge box, with each of the first hinge box and the second hinge box being configured for attachment to the vehicle. A first support member is rotatably attached to the first hinge box, and a second support member is rotatably attached to the second hinge box. The first support member and the second support member are configured for simultaneous rotation about a rotation axis between a closed position and an open position. The decklid hinge assembly further includes a torque mechanism. The torque mechanism includes a torque rod extending between and rotatably supported by the first hinge box and the second hinge box. The torque rod includes a first axial end and a second axial end. The second axial end is pre-loaded with a twisting moment relative to the first axial end to generate a twisting torque. A lever is attached to and rotatable with the first axial end of the torque rod, and is secured in a position relative to the first hinge box. A linkage system interconnects the second axial end of the torque rod and the second support member. The linkage system is configured for transferring the torque from the torque rod to the second support member to assist the simultaneous movement of the first support member and second support member from the closed position into the open position. A clamping block is fixedly attached to one of the lever and the linkage system. The clamping block is configured to positionally secure the torque rod to the one of the lever and the linkage system at any relative rotational position therebetween.

A vehicle is also provided. The vehicle includes a body that extends along a longitudinal axis. The body defines an opening. A decklid is coupled to the body and is configured for sealing the opening. A decklid hinge assembly rotatably attaches the decklid to the body for rotation about a rotation axis between a closed position and an open position. The decklid hinge assembly includes a first hinge box and a second hinge box. The second hinge box is laterally spaced from the first hinge box across the longitudinal axis of the body. Each of the first hinge box and the second hinge box are attached to the body. A first support member is rotatably attached to the first hinge box. A second support member is rotatably attached to the second hinge box. The first support member and the second support member are configured for simultaneous rotation about the rotation axis between the closed position and the open position. The decklid hinge assembly includes a torque mechanism that is configured for applying a torque to the first support member and the second support member. The torque assists the simultaneous movement of the first support member and the second support member from the closed position into the open position.

The torque mechanism includes a first torque rod and a second torque rod. The first torque rod extends between and is rotatably supported by the first hinge box and the second hinge box. The first torque rod includes a first axial end that is disposed adjacent the first hinge box, and a second axial end that is disposed adjacent the second hinge box. The first axial end and the second axial end of the first torque rod are twisted relative to each other to generate a torque. A first lever is attached to and is rotatable with the first axial end of the first torque rod, and is secured in a position relative to the first hinge box. A first linkage system interconnects the second axial end of the first torque rod and the second support member. The first linkage system is configured for transferring the torque from the first torque rod to the second support member. A first clamping block is fixedly attached to one of the first lever and the first linkage system. The first clamping block is configured for positionally securing the first torque rod to the one of the first lever and the first linkage system at any relative rotational position therebetween. The second torque rod extends between and is rotatably supported by the first hinge box and the second hinge box. The second torque rod includes a first axial end disposed adjacent the second hinge box, and a second axial end disposed adjacent the first hinge box. The first axial end and the second axial end of the second torque rod are twisted relative to each other to generate a torque. A second lever is attached to and is rotatable with the first axial end of the second torque rod, and is secured in a position relative to the second hinge box. A second linkage system interconnects the second axial end of the second torque rod and the first support member. The second linkage system is configured for transferring the torque from the second torque rod to the first support member. A second clamping block is fixedly attached to one of the second lever and the second linkage system. The second clamping block is configured for positionally securing the second torque rod to the one of the second lever and the second linkage system at any relative rotational position therebetween.

Accordingly, no bends in the torque rods are required to connect the torque rods to either the hinge boxes or the support members. More specifically, the levers connect one axial end of each of the torque rods to one of the hinge boxes, and the linkage systems connect the other axial end of each of the torque rods to one of the support members. The lever and the linkage systems are attached to the torque rods in a manner that eliminates any bends in the torque rod, thereby reducing and/or eliminating any bending stresses in the torque rods. Additionally, because no bends are required to secure the axial ends of the torque rods to the hinge boxes and/or the support members, the overall length of the torque rods may be maximized to fit within the cross vehicle packaging restraints of the vehicle. Furthermore, the first torque rod and/or the second torque rod may be positioned in any desirable rotational position relative to the first clamping block and the second clamping block respectively and secured in place, thereby providing an infinite degree of rotational adjustment to pre-load the first torque rod and/or the second torque rod respectively.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic perspective view of a lever of the hinge assembly.

FIG. 5 is a schematic exploded fragmentary perspective view of a clamping block configured for attaching a torque rod to linkage system.

FIG. 6 is a schematic partial perspective view of the clamping block attaching the torque rod to the linkage system.

FIG. 7 is a schematic cross sectional view of the clamping block.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
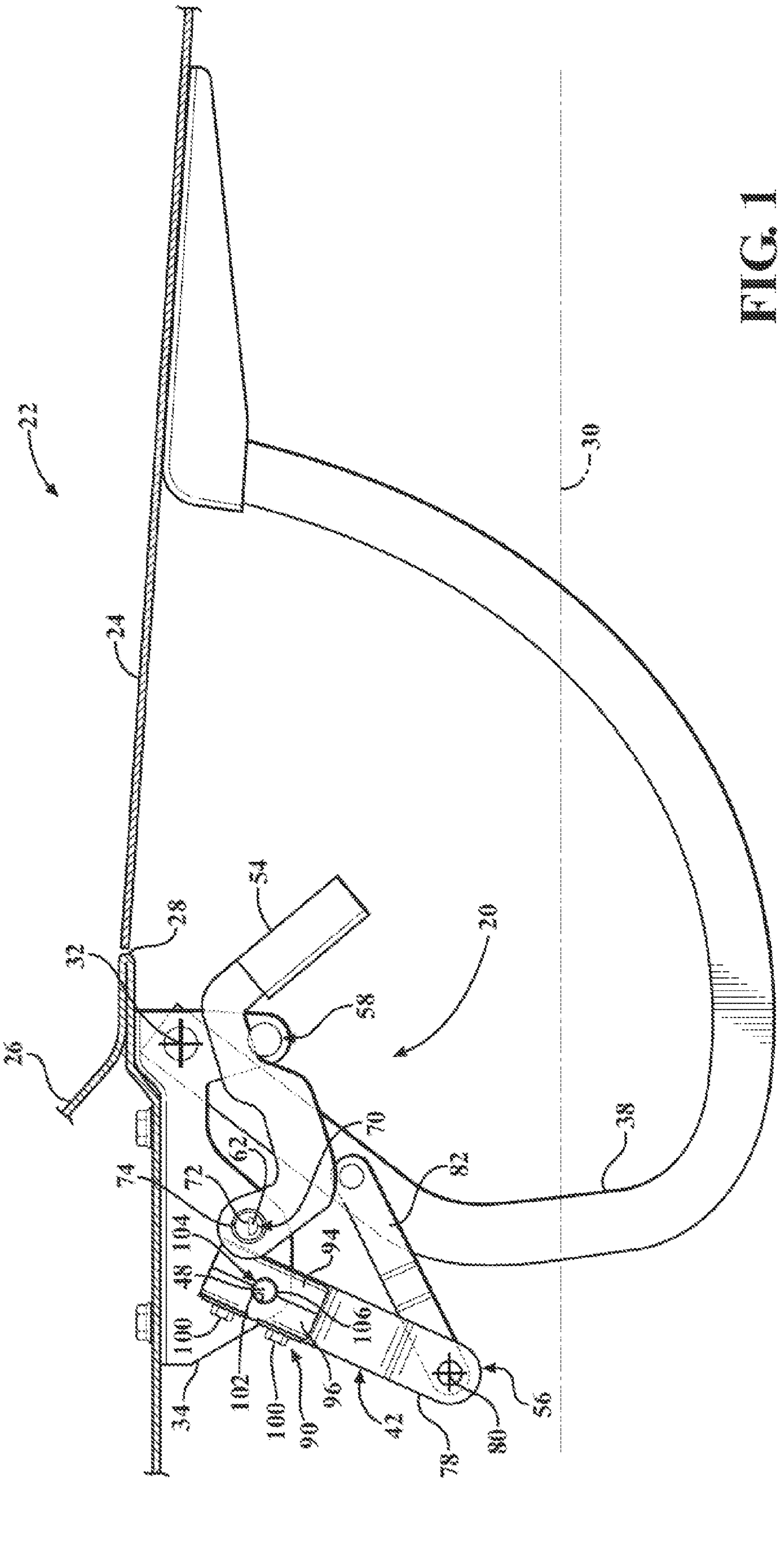
FIG. 1 is a schematic cross sectional view from a side of the vehicle showing the hinge assembly.

Referring to the Figures, wherein like numerals indicate like parts throughout the several views, a decklid hinge assembly, hereinafter referred to as the hinge assembly, is generally shown at 20. Referring to FIG. 1, the hinge assembly 20 is for a vehicle 22, and rotatably couples a decklid 24 to a body 26 of the vehicle 22. The decklid 24 seals an opening 28 defined by the body 26, such as for example, a trunk or cargo area of the vehicle 22.

The body 26 extends along a longitudinal axis 30 between a forward end of the body 26 and a rearward end of the body 26. The hinge assembly 20 rotatably attaches the decklid 24 to the body 26 for rotation about a rotation axis 32. As shown, the rotation axis 32 is perpendicular relative to the longitudinal axis 30 of the vehicle 22. However, the relative positions between the rotation axis 32 and the longitudinal axis 30 of the vehicle 22 may differ from that shown and described herein. The decklid 24 is rotatable between a closed position for sealing the opening 28, and an open position for allowing access to the opening 28.

Figure 2:
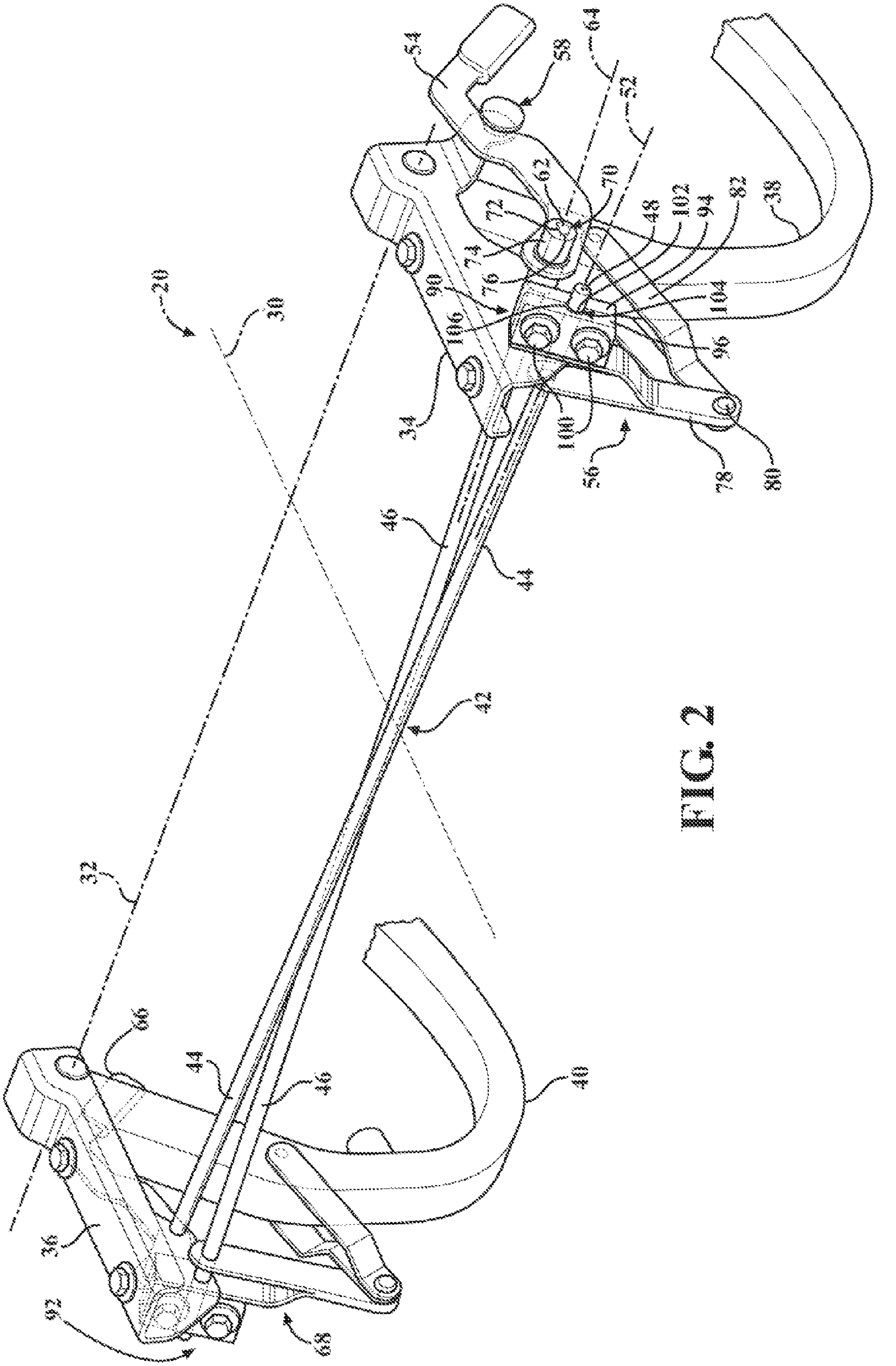
FIG. 2 is a schematic perspective view from a first angle of a hinge assembly for rotatably supporting a decklid of a vehicle.
Figure 3:
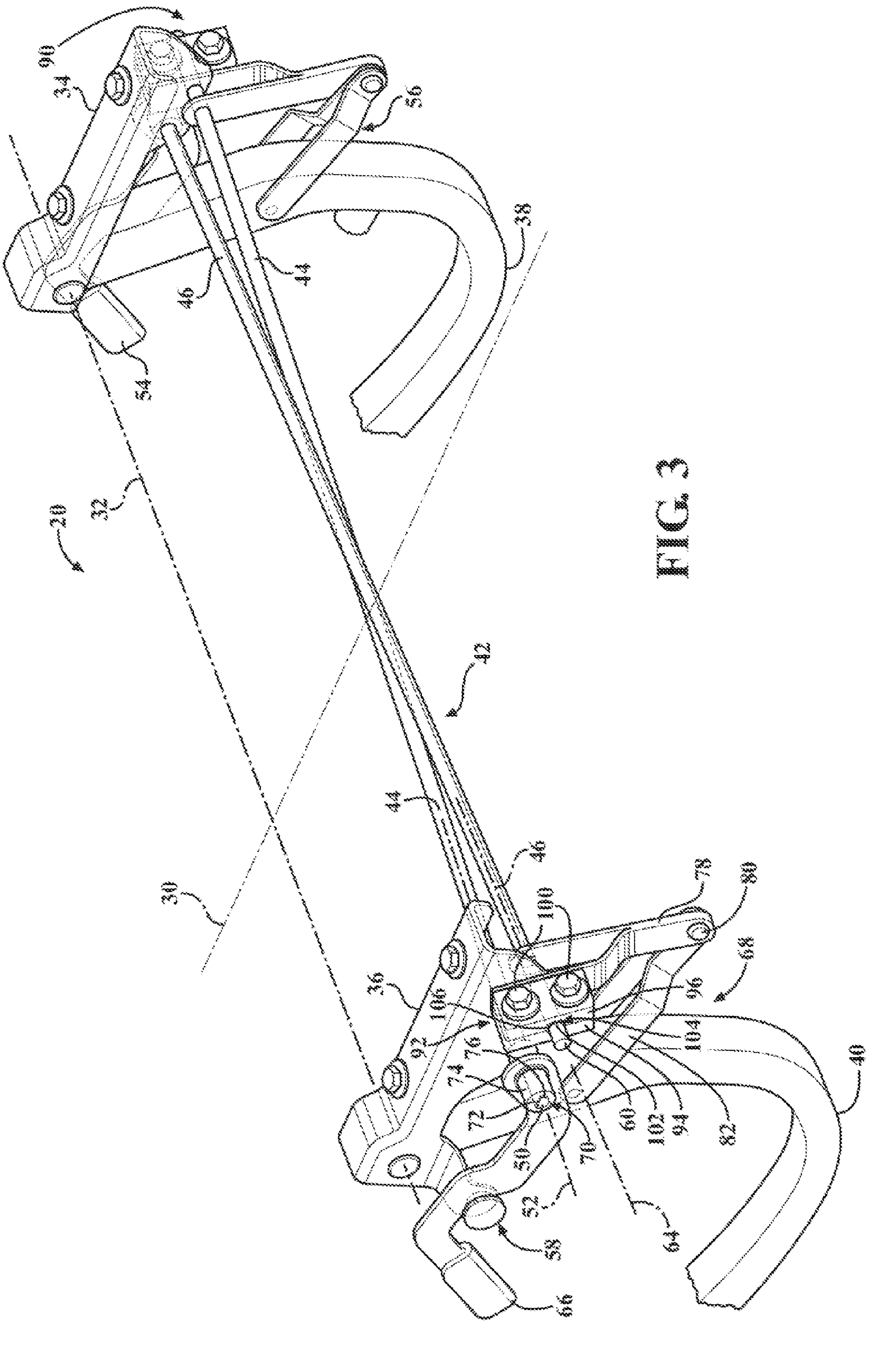
FIG. 3 is a schematic perspective view from a second angle of the hinge assembly.

Referring to FIGS. 2 and 3, the hinge assembly 20 includes a first hinge box 34 and a second hinge box 36. The second hinge box 36 is laterally spaced from the first hinge box 34 across the longitudinal axis 30 of the body 26. Accordingly, the first hinge box 34 and the second hinge box 36 are disposed on opposing lateral sides of the longitudinal axis 30. Each of the first hinge box 34 and the second hinge box 36 are attached to the body 26. The first hinge box 34 and the second hinge box 36 may be attached to the body 26 in any suitable fashion, such as for example, with fasteners such as bolts and/or screws.

A first support member 38 is rotatably attached to the first hinge box 34. A second support member 40 is rotatably attached to the second hinge box 36. The first support member 38 and the second support member 40 are attached to and support the decklid 24 relative to the body 26. The first support member 38 and the second support member 40 are configured for simultaneous rotation about the rotation axis 32 between the closed position and the open position to rotate the decklid 24 between the closed position and the open position. The first support member 38 and the second support member 40 may be shaped in any suitable manner, such as but not limited to the gooseneck configuration shown in the Figures.

A torque mechanism 42 interconnects the first hinge box 34 and the second hinge box 36 with the first support member 38 and the second support member 40. The torque mechanism 42 is pre-loaded to assist in opening the decklid 24. The torque mechanism 42 is configured for applying a torque to at least one of the first support member 38 and the second support member 40 to assist the simultaneous movement of the first support member 38 and the second support member 40 from the closed position into the open position.

The torque mechanism 42 includes a first torque rod 44 and a second torque rod 46. The first torque rod 44 extends between and is rotatably supported by the first hinge box 34 and the second hinge box 36. The first torque rod 44 includes a first axial end 48 that is disposed adjacent the first hinge box 34, and a second axial end 50 that is disposed adjacent the second hinge box 36. The first torque rod 44 extends along a first rod axis 52. The first rod axis 52 is disposed along the longitudinal center of the first torque rod 44. The first axial end 48 and the second axial end 50 of the first torque rod 44 are linearly disposed and extend along the first rod axis 52, with each of the first axial end 48 and the second axial end 50 of the first torque rod 44 extending linearly outboard away from the longitudinal axis 30 beyond a respective one of the first hinge box 34 and the second hinge box 36. As used herein, the term outboard is defined as disposed farther from. Accordingly, the first axial end 48 and the second axial end 50 are disposed farther from the longitudinal axis 30 than the first hinge box 34 and/or the second hinge box 36. As shown and described herein, the first axial end 48 of the first torque rod 44 is disposed adjacent and outboard of the first hinge box 34 and the second axial end 50 of the first torque rod 44 is disposed adjacent and outboard of the second hinge box 36.

A first lever 54 is attached to and rotatable with one of the first axial end 48 and the second axial end 50 of the first torque rod 44. The first lever 54 is secured in a position relative to one of the first hinge box 34 and the second hinge box 36. As shown, the first lever 54 is attached to and rotatable with the first axial end 48 of the first torque rod 44, and secured in a position relative to the first hinge box 34. The first lever 54 is rotationally fixed relative to the first axial end 48 of the first torque rod 44 such that rotation of the first lever 54 rotates the first torque rod 44.

A first linkage system 56 interconnects another of the first axial end 48 and the second axial end 50 of the first torque rod 44, and one of the first support member 38 and the second support member 40. As shown, the first linkage system 56 interconnects the second axial end 50 of the first torque rod 44 with the second support member 40. The first linkage system 56 transfers a torque from the first torque rod 44 to the one of the first support member 38 and the second support member 40. The torque applied to the first support member 38 and/or the second support member 40 assists the simultaneous movement of the first support member 38 and/or the second support member 40 from the closed position into the open position. As shown, the first linkage system 56 transfers the torque from the first torque rod 44 to the second support member 40.

The first axial end 48 and the second axial end 50 of the first torque rod 44 are twisted relative to each other to generate the torque that is stored within the first torque rod 44. During assembly, the first lever 54 is rotated into position and secured in that position relative to the first hinge box 34. This rotation, about the first rod axis 52, twists the first torque rod 44 between the first axial end 48, secured to the first lever 54, and the second axial end 50, secured to the first linkage system 56, thereby generating the torque used to assist in opening the decklid 24. The first hinge box 34 includes a retention feature 58 that is configured for securing the first lever 54 in position relative to the first hinge box 34. The retention feature 58 prevents the rotation of the first lever 54 in a direction that would allow the first torque rod 44 to untwist, and also resists lateral movement away from the longitudinal axis 30 to prevent unintentional disengagement of the first lever 54 from the retention feature 58.

The second torque rod 46 extends between and is rotatably supported by the first hinge box 34 and the second hinge box 36. The second torque rod 46 includes a first axial end 60 that is disposed adjacent the second hinge box 36, and a second axial end 62 that is disposed adjacent the first hinge box 34. As such, the relative positions of the first axial end 60 and the second axial end 62 of the second torque rod 46 are reversed from those of the first torque rod 44. The second torque rod 46 extends along a second rod axis 64. The second rod axis 64 is disposed along the longitudinal center of the second torque rod 46. The first axial end 60 and the second axial end 62 of the second torque rod 46 are linearly disposed and extend along the second rod axis 64, with each of the first axial end 60 and the second axial end 62 of the second torque rod 46 extending linearly outboard away from the longitudinal axis 30 beyond a respective one of the first hinge box 34 and the second hinge box 36. Accordingly, the first axial end 60 and the second axial end 62 of the second torque rod 46 are disposed farther from the longitudinal axis 30 than the first hinge box 34 and/or the second hinge box 36. As shown and described herein, the first axial end 60 of the second torque rod 46 is disposed adjacent and outboard of the second hinge box 36 and the second axial end 62 of the second torque rod 46 is disposed adjacent and outboard of the first hinge box 34.

A second lever 66 is attached to and rotatable with one of the first axial end 60 and the second axial end 62 of the second torque rod 46. The second lever 66 is secured in a position relative to one of the first hinge box 34 and the second hinge box 36. As shown, the second lever 66 is attached to and rotatable with the first axial end 60 of the second torque rod 46, and secured in a position relative to the second hinge box 36. The second lever 66 is rotationally fixed relative to the first axial end 60 of the second torque rod 46 such that rotation of the second lever 66 rotates the second torque rod 46.

A second linkage system 68 interconnects another of the first axial end 60 and the second axial end 62 of the second torque rod 46, and one of the first support member 38 and the second support member 40. As shown, the second linkage system 68 interconnects the second axial end 62 of the second torque rod 46 with the first support member 38. The second linkage system 68 transfers a torque from the second torque rod 46 to the one of the first support member 38 and the second support member 40. The torque applied to the first support member 38 and/or the second support member 40 assists the simultaneous movement of the first support member 38 and/or the second support member 40 from the closed position into the open position. As shown, the second linkage system 68 transfers the torque from the second torque rod 46 to the first support member 38.

The first axial end 60 and the second axial end 62 of the second torque rod 46 are twisted relative to each other to generate the torque that is stored within the second torque rod 46. During assembly, the second lever 66 is rotated into position and secured in that position relative to the second hinge box 36. This rotation, about the second rod axis 64, twists the second torque rod 46 between the first axial end 60, secured to the second lever 66, and the second axial end 62, secured to the second linkage system 68, thereby generating the torque used to assist in opening the decklid 24. The second hinge box 36 includes a retention feature 58 that is configured for securing the second lever 66 in position relative to the second hinge box 36. The retention feature 58 prevents the rotation of the second lever 66 in a direction that would allow the second torque rod 46 to untwist, and also resists lateral movement away from the longitudinal axis 30 to prevent unintentional disengagement of the second lever 66 from the retention feature 58.

The first lever 54 and the second lever 66 each include a rotational locking mechanism 70 rotationally securing the first lever 54 to the first torque rod 44 and the second lever 66 to the second torque rod 46. The rotational locking mechanism 70 may include any mechanism capable of rotationally securing the first lever 54 and the second lever 66 to the first torque rod 44 and the second torque rod 46 respectively, while maintaining the straight axial orientation of the first torque rod 44 and the second torque rod 46 respectively. In other words, the rotational locking mechanism 70 rotationally secures the first lever 54 and the second lever 66 to the first torque rod 44 and the second torque rod 46 respectively without bending the respective axial ends of the first torque rod 44 and/or the second torque rod 46. For example, referring to FIG. 4, the rotational locking mechanism 70 may include a lever aperture 72 having a non-annular shape defined by the first lever 54 and/or the second lever 66. As shown, a lever barrel portion 74 is welded or otherwise securely attached to the first lever 54 and/or the second lever 66, with the lever barrel portion 74 defining the lever aperture 72. As shown in FIGS. 2 and 3, the lever aperture 72 is in mated engagement with a lever extension 76 of the first torque rod 44 and/or the second torque rod 46. The lever extension 76 includes a non-annular shape that corresponds to the non-annular shape of the lever aperture 72. As shown, the non-annular shape of the lever aperture 72 and the non-annular shape of the lever extension 76 define a D-shaped configuration. However, it should be appreciated that other non-annular shapes may alternatively be used.

Referring to FIGS. 2 and 3, the first linkage system 56 and the second linkage system 68 are identical, with each including a wind-up link 78 that is attached to and rotatable with the first torque rod 44 and the second torque rod 46 respectively. The wind-up link 78 extends radially away from the first rod axis 52 or the second rod axis 64 respectively to a distal pivot point 80, which is laterally spaced from the first rod axis 52 and the second rod axis 64 respectively. The first linkage system 56 and the second linkage system 68 further include a driven link 82 having a first end rotatable coupled to the wind-up link 78 at the pivot point 80 and a second end rotatably coupled to the second support member 40 and the first support member 38 respectively.

A first clamping block 90 is fixedly attached to the first linkage system 56 and positionally and rotationally secures the first torque rod 44 to the first linkage system 56 at any relative rotational position therebetween. A second clamping block 92 is fixedly attached to the second linkage system 68 and positionally and rotationally secures the second torque rod 46 to the second linkage system 68 at any relative rotational position therebetween. While the torque mechanism 42 is shown herein with the first clamping block 90 interconnecting the first torque rod 44 and the first linkage system 56, and the first lever 54 coupled to the first torque rod 44 via the retention feature 58 interlocking the first lever 54 and the first torque rod 44, it should be appreciated that the torque mechanism 42 may alternatively employ another clamping block to connect the first lever 54 to the first torque rod 44 in place of the retention feature 58. As such, the torque mechanism 42 may include one clamping block interconnecting either the first lever 54 or the first linkage system 56 to the first torque rod 44, or may include two clamping blocks, with one connecting the first lever 54 to the first torque rod 44 and another connecting the first linkage system 56 to the first torque rod 44. Similarly, While the torque mechanism 42 is shown herein with the second clamping block 92 interconnecting the second torque rod 46 and the second linkage system 68, and the second lever 66 coupled to the second torque rod 46 via the retention feature 58 interlocking the second lever 66 and the second torque rod 46, it should be appreciated that the torque mechanism 42 may alternatively employ another clamping block to connect the second lever 66 to the second torque rod 46 in place of the retention feature 58. As such, the torque mechanism 42 may include one clamping block interconnecting either the second lever 66 or the second linkage system 68 to the second torque rod 46, or may include two clamping blocks, with one connecting the second lever 66 to the second torque rod 46 and another connecting the second linkage system 68 to the second torque rod 46.

Referring to FIGS. 5 through 7, the first clamping block 90 is identical to the second clamping block 92. The clamping blocks 90, 92 each include a first portion 94 and a second portion 96. The first portion 94 is attached to one of the levers 54, 66 or the linkage systems 56, 68. As shown, the first portion 94 of each of the first clamping block 90 and the second clamping block 92 are attached to the wind-up link 78 of the first linkage system 56 and the second linkage system 68 respectively. However, if the clamping blocks 90, 92 were configured to connect the first lever 54 and the second lever 66 to the first torque rod 44 and the second torque rod 46 respectively, then the first portions 94 of the first clamping block 90 and the second clamping block 92 would be attached to the first lever 54 and the second lever 66 respectively. The second portions 96 of the clamping blocks 90, 92 are removably attached to the first portions 94.

The clamping blocks 90, 92 include a fastening mechanism 98 that is configured for attaching the second portion 96 to the first portion 94. The fastening mechanism 98 may include any device capable of securing the second portion 96 to the first portion 94 with enough clamping force therebetween to positionally secure one of the torque rods 44, 46 therebetween. For example, the fastening mechanism 98 may include at least one fastener 100 extending through the first portion 94 and into threaded engagement with the second portion 96. Two fasteners 100 are shown in the Figures. Alternatively, it is contemplated that some other fastening mechanism not shown or described herein may be employed, such as, for example, a cam and lever system.

The first portion 94 and the second portion 96 cooperate to define an annular passage 102 therebetween. As shown, each of the first portion 94 and the second portion 96 define a semi-circular recess, that when joined together, form the annular passage 102. The annular passage 102 receives one of the torque rods 44, 46 therethrough, with the first portion 94 and the second portion 96 drawn together by the fastening mechanism 98 to provide a clamping force against the torque rod 44, 46 to secure the torque rod 44, 46 in place relative to the clamping block 90, 92.

The annular passage 102 includes an anti-rotation feature 104 for frictionally engaging the torque rod 44, 46. The anti-rotation feature 104 engages the torque rod 44, 46 disposed within the annular passage 102 to prevent rotation of the torque rod 44, 46 relative to the clamping block 90, 92 when the second portion 96 is attached to and clamped against the first portion 94. The anti-rotation feature 104 may include, for example, a plurality of deformations 106, such as but not limited to a plurality of ridges extending along a central axis parallel to the torque rod 44, 46 disposed within the annular passage 102, and extending radially inward toward the torque rod 44, 46. The anti-rotation feature 104 engages the torque rod 44, 46 and increases the friction therebetween when the first portion 94 is clamped against the second portion 96, to prevent rotation of the torque rod 44, 46 relative to the clamping block 90, 92. Accordingly, the torque rod 44, 46 may be angularly positioned relative to the clamping block in any angular position about the rod axis 52, 64, and secured in place by fastening the second portion 96 of the clamping block 90, 92 to the first portion 94 to clamp the torque rod 44, 46 between the first portion 94 and the second portion 96. As such, the pre-load torque in the torque rod 44, 46 may be adjusted during installation to any desired torque value suitable for the application.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A hinge assembly for a vehicle, the hinge assembly comprising:

a first hinge box and a second hinge box spaced from the first hinge box, wherein each of the first hinge box and the second hinge box are configured for attachment to the vehicle;

a first support member rotatably attached to the first hinge box, and a second support member rotatably attached to the second hinge box, wherein the first support member and the second support member are configured for simultaneous rotation about a rotation axis between a closed position and an open position;

a torque mechanism including:

a torque rod extending between and rotatably supported by the first hinge box and the second hinge box, wherein the torque rod includes a first axial end and a second axial end pre-loaded with a twisting moment relative to the first axial end to generate a twisting torque;

a lever attached to and rotatable with the first axial end of the torque rod and secured in a position relative to the first hinge box;

a linkage system interconnecting the second axial end of the torque rod and the second support member, and configured for transferring the torque from the torque rod to the second support member to assist the simultaneous movement of the first support member and second support member from the closed position into the open position; and a clamping block fixedly attached to one of the lever and the linkage system and configured for positionally securing the torque rod to the one of the lever and the linkage system at any relative rotational position therebetween.

2. A hinge assembly as set forth in claim 1 wherein the clamping block includes a first portion attached to the one of the lever and the linkage system, and a second portion removably attached to the first portion.

3. A hinge assembly as set forth in claim 2 wherein the first portion and the second portion cooperate to define an annular passage therebetween for receiving the torque rod therethrough.

4. A hinge assembly as set forth in claim 3 wherein the annular passage includes an anti-rotation feature for frictionally engaging the torque rod to prevent rotation of the torque rod relative to the clamping block when the second portion is attached to the first portion.

5. A hinge assembly as set forth in claim 4 wherein the anti-rotation feature includes a plurality of deformations extending radially inward toward the torque rod.

6. A hinge assembly as set forth in claim 5 wherein the plurality of deformations includes a plurality of ridges extending along a longitudinal axis of the torque rod and annularly spaced about the annular passage.

7. A hinge assembly as set forth in claim 2 wherein the clamping block includes a fastening mechanism configured for attaching the second portion to the first portion.

8. A decklid hinge assembly as set forth in claim 7 wherein the fastening mechanism includes at least one fastener extending through the first portion and into threaded engagement with the second portion.

9. A hinge assembly as set forth in claim 1 wherein the torque rod extends along a linear rod axis without any bends therein, with the first axial end and the second axial end disposed along the rod axis.

10. A hinge assembly as set forth in claim 9 wherein the first hinge box and the second hinge box are disposed on opposing lateral sides of a longitudinal axis, with each of the first axial end and the second axial end of the torque rod extending outboard away from the longitudinal axis beyond a respective one of the first hinge box and the second hinge box.

11. A hinge assembly as set forth in claim 1 wherein the linkage system includes a wind-up link attached to and rotatable with the torque rod, and extending radially away from the rod axis to a distal pivot point laterally spaced from the rod axis.

12. A hinge assembly as set forth in claim 11 wherein the linkage system includes a driven link having a first end rotatably coupled to the wind-up link at the pivot point, and a second end rotatably coupled to the second support member.

13. A vehicle comprising:

a body extending along a longitudinal axis and defining an opening;

a decklid coupled to the body and configured for sealing the opening;

a decklid hinge assembly rotatably attaching the decklid to the body for rotation about a rotation axis between a closed position and an open position, the decklid hinge assembly including:

a first hinge box and a second hinge box laterally spaced from the first hinge box across the longitudinal axis of the body, wherein each of the first hinge box and the second hinge box are attached to the body;

a first support member rotatably attached to the first hinge box, and a second support member rotatably attached to the second hinge box, wherein the first support member and the second support member are configured for simultaneous rotation about the rotation axis between the closed position and the open position;

a torque mechanism configured for applying a torque to the first support member and the second support member to assist the simultaneous movement of the first support member and the second support member from the closed position into the open position, the torque mechanism including:

a first torque rod extending between and rotatably supported by the first hinge box and the second hinge box, wherein the first torque rod includes a first axial end disposed adjacent the first hinge box, and a second axial end disposed adjacent the second hinge box;

wherein the first axial end and the second axial end of the first torque rod are twisted relative to each other to generate a torque;

a first lever attached to and rotatable with the first axial end of the first torque rod and secured in a position relative to the first hinge box;

a first linkage system interconnecting the second axial end of the first torque rod and the second support member, and configured for transferring the torque from the first torque rod to the second support member;

a first clamping block fixedly attached to one of the first lever and the first linkage system and configured for positionally securing the first torque rod to the one of the first lever and the first linkage system at any relative rotational position therebetween;

a second torque rod extending between and rotatably supported by the first hinge box and the second hinge box, wherein the second torque rod includes a first axial end disposed adjacent the second hinge box, and a second axial end disposed adjacent the first hinge box;

wherein the first axial end and the second axial end of the second torque rod are twisted relative to each other to generate a torque;

a second lever attached to and rotatable with the first axial end of the second torque rod and secured in a position relative to the second hinge box;

a second linkage system interconnecting the second axial end of the second torque rod and the first support member, and configured for transferring the torque from the second torque rod to the first support member; and a second clamping block fixedly attached to one of the second lever and the second linkage system and configured for positionally securing the second torque rod to the one of the second lever and the second linkage system at any relative rotational position therebetween.

14. A vehicle as set forth in claim 13 wherein the each of the first clamping block and the second clamping block includes a first portion and a second portion attached to the first portion.

15. A vehicle as set forth in claim 14 wherein the first portion and the second portion of each of the first clamping block and the second clamping block cooperate to define an annular passage therebetween.

16. A vehicle as set forth in claim 15 wherein the annular passage of each of the first clamping block and the second clamping block includes an anti-rotation feature for frictionally engaging the first torque rod and the second torque rod respectively to prevent relative rotation therebetween.

17. A vehicle as set forth in claim 16 wherein the anti-rotation feature includes a plurality of deformations extending radially inward toward a longitudinal center of the annular passage.

18. A vehicle as set forth in claim 17 wherein the plurality of deformations includes a plurality of ridges extending along a longitudinal axis of the annular passage and annularly spaced about the annular passage.

19. A vehicle as set forth in claim 14 wherein each of the first clamping block and the second clamping block includes a fastening mechanism configured for attaching the second portion to the first portion.

20. A vehicle as set forth in claim 19 wherein the fastening mechanism includes at least one fastener extending through the first portion and into threaded engagement with the second portion.

* * * * *